United States Patent
Decook et al.

(10) Patent No.: US 11,328,581 B2
(45) Date of Patent: *May 10, 2022

(54) "SMART" SENSOR DATA ANALYTICS FOR EQUIPMENT DIAGNOSIS

(71) Applicant: ITT MANUFACTURING ENTERPRISES LLC., Wilmington, DE (US)

(72) Inventors: Bradley C. Decook, Victor, NY (US); Daniel Kernan, Liverpool, NY (US)

(73) Assignee: ITT MANUFACTURING ENTERPRISES LLC, Wilmington, DE (US)

(*) Notice: Subject to any disclaimer, the term of this patent is extended or adjusted under 35 U.S.C. 154(b) by 584 days.

This patent is subject to a terminal disclaimer.

(21) Appl. No.: 16/217,901

(22) Filed: Dec. 12, 2018

(65) Prior Publication Data

US 2019/0180604 A1 Jun. 13, 2019

Related U.S. Application Data

(60) Provisional application No. 62/598,123, filed on Dec. 13, 2017.

(51) Int. Cl.
*G08B 29/18* (2006.01)
*G01M 99/00* (2011.01)
(Continued)

(52) U.S. Cl.
CPC .......... *G08B 29/18* (2013.01); *G01M 99/005* (2013.01); *G05B 23/027* (2013.01); *G05B 23/0235* (2013.01); *G08B 21/187* (2013.01)

(58) Field of Classification Search
CPC .. G08B 21/187; G08B 29/18; G05B 23/0235; G05B 23/027; G05B 23/0283; F05D 2260/80; G01D 1/18
See application file for complete search history.

(56) References Cited

U.S. PATENT DOCUMENTS

| 5,735,698 A | 4/1998 | Bakker et al. |
| 6,394,820 B1 | 5/2002 | Palaniappa et al. |

(Continued)

FOREIGN PATENT DOCUMENTS

KR 100730619 B1 6/2007

OTHER PUBLICATIONS

International Search Report for corresponding International PCT Application No. PCT/US20/57651 dated Jan. 27, 2021.

*Primary Examiner* — Mirza F Alam
(74) *Attorney, Agent, or Firm* — Carter, DeLuca & Farrell LLP; George Likourezos; Bret Shapiro

(57) ABSTRACT

A system for performing sensor data analytics for equipment diagnostics featuring an alarm signature and diagnostic detector having a signal processor configured to receive signaling containing information about an alarm signature for sensed data that is time-stamped for captured alarm signature parameters in order to monitor rotary equipment, and also about diagnostic detector signatures for diagnostic detectors related to alarm conditions for the rotary equipment; and determine corresponding signaling containing information about an alarm diagnosis based upon a match between the alarm signature and one of the diagnostic detector signatures contained in the signaling received.

18 Claims, 5 Drawing Sheets

Alarm 'Signature' Creation

(51) Int. Cl.
*G08B 21/18* (2006.01)
*G05B 23/02* (2006.01)

(56) References Cited

U.S. PATENT DOCUMENTS

| | | | |
|---|---|---|---|
| 7,308,322 B1* | 12/2007 | Discenzo | G05B 23/0221 700/175 |
| 7,457,785 B1* | 11/2008 | Greitzer | G01D 1/18 706/12 |
| 2003/0028269 A1* | 2/2003 | Spriggs | G05B 15/02 700/83 |
| 2004/0242030 A1 | 12/2004 | Palaniappa et al. | |
| 2006/0054802 A1 | 3/2006 | Johnston | |
| 2008/0048603 A1* | 2/2008 | Discenzo | G05B 19/4063 318/561 |
| 2011/0213744 A1* | 9/2011 | Sparling | G05B 23/0227 706/46 |
| 2014/0379300 A1* | 12/2014 | Devine | F04B 51/00 702/182 |

* cited by examiner

Figure 1: 'SMART' Sensor Data Analytics System Diagram

Figure 2: 'Alarm' Identification & Data Capture

Figure 3: Alarm 'Signature' Creation

Figure 4: Alarm 'Signature' & Diagnostics 'Detector'

"SMART" SENSOR DATA ANALYTICS FOR EQUIPMENT DIAGNOSIS

CROSS REFERENCE TO RELATED APPLICATIONS

This application claims benefit to provisional application No. 62/598,123, filed 13 Dec. 2017, which is hereby incorporated by reference in its entirety.

BACKGROUND OF THE INVENTION

1. Field of the Invention

The present invention relates to a system for monitoring rotary equipment; more particularly to a system for monitoring rotary equipment and diagnosing alarm conditions.

2. Brief Description of Related Art

In the prior art, large sets of data (so-called "big data") are required to develop alarm detectors. The large sets of data need to be provided from the sensor modules placed or arranged on rotary equipment and communicated to a remote processing computer, server, or other processing configuration. The large sets of data may be communicated using known hard wire or wireless data communication technology, which causes large scale remote data processing issues, including bandwidth issues, etc.

Moreover, physics-based models are currently used in the prior art to diagnose equipment alarms. Their success rate is approximately 50/50 and requires resident experts to complete the diagnosis.

In view of these shortcomings of the know techniques, there is a need in the industry for a better way to monitor rotary equipment and diagnosis alarm conditions that develop in the rotary equipment.

SUMMARY OF THE INVENTION

The present invention solves this problem in the art by using large sets of smart data from a plethora of smart sensors that can be utilized to perform data analytics that effectively diagnose the root causes of equipment alarms.

According to some embodiments, the present invention may include, or take the form of, a system or apparatus for performing sensor data analytics for equipment diagnostics featuring: an alarm signature and diagnostic detector having a signal processor configured to receive signaling containing information about an alarm signature for sensed data that is time-stamped for captured alarm signature parameters in order to monitor rotary equipment, and also about diagnostic detector signatures for diagnostic detectors related to alarm conditions for the rotary equipment; and determine corresponding signaling containing information about an alarm diagnosis based upon a match between the alarm signature and one of the diagnostic detector signatures contained in the signaling received.

According to some embodiments of the present invention, the system may include one or more of the features, as follows:

The signal processor may be configured to provide the corresponding signaling containing information about the alarm diagnosis for further processing, including shutting down the rotary equipment for repair, or providing an audio or visual alarm warning signal, or scheduling a suitable maintenance event.

The system may include a smart condition monitoring device that is placed in relation to the rotary equipment and configured to sense the captured alarm signature parameters, time-stamp the captured alarm signature parameters sensed, and provide sensed signaling containing information about sensed, time-stamped and captured alarm signature parameters.

The smart condition monitoring device may include, or form part of, the alarm signature and diagnostic detector, or vice versa.

By way of example, the sensed, time-stamped and captured alarm signature parameters may include one or more of the following:

vibration (X, Y, Z axes),
equipment temperature,
oil level or temperature and % RH (water presence),
suction or discharge pressure,
motor torque, flux or speed,
flow, or
seal health.

By way of further example, the diagnostic detector signatures may include signatures related to a cavitation alarm condition, a dry run alarm condition, a bearing failure alarm condition, a mechanical misalignment alarm condition, a mechanical looseness alarm condition, a vibration (X, Y, Z axes) alarm condition, an equipment temperature alarm condition, an oil level (% RH (water presence)) or temperature alarm condition, a suction or discharge pressure alarm condition, a motor torque, flux or speed alarm condition, a flow alarm condition, or a seal health alarm condition.

Each alarm signature and diagnostic detector may use a respective or unique subset of the captured alarm signature parameters.

The alarm signature and diagnostic detector may be configured to self-learn, e.g., by receiving both labeled or unlabeled alarm signatures for storing in a diagnostic detector signature database in a memory as one or more stored diagnostic detector signatures.

By way of example, the signal processor may be configured to:

compare an unlabeled alarm signature to the one or more of existing diagnostic detector signatures to find a best match, label the unlabeled alarm signature as an updated labeled alarm signature, and update the diagnostic detector signature database with the updated labeled alarm signature, thus learning a new diagnostic detector signature.

The alarm signature and diagnostic detector may be configured remotely from the smart condition monitoring device, e.g., including at a remote location off-site from the rotary equipment in a cloud-based server.

According to some embodiments, the present invention may also take the form of a method having steps for receiving, with a signal processor in an alarm signature and diagnostic detector, signaling containing information about an alarm signature for sensed data that is time-stamped for captured alarm signature parameters in order to monitor rotary equipment, and also about diagnostic detector signatures for diagnostic detectors related to alarm conditions for the rotary equipment; and determining, with the signal processor, corresponding signaling containing information about an alarm diagnosis based upon a match between the alarm signature and one of the diagnostic detector signatures contained in the signaling received.

The method may also include one or more of the features set forth herein.

The present invention provides a better way to monitor rotary equipment and diagnosis alarm conditions that develop in the rotary equipment.

By way of example, applications may include the following: Industrial equipment diagnostic, e.g., for rotary equipment like pumps, motors, fans.

BRIEF DESCRIPTION OF THE DRAWING

The drawing includes FIGS. 1-5, which are not necessarily drawn to scale.

DETAILED DESCRIPTION OF THE INVENTION

FIG. 1

Figure 1:
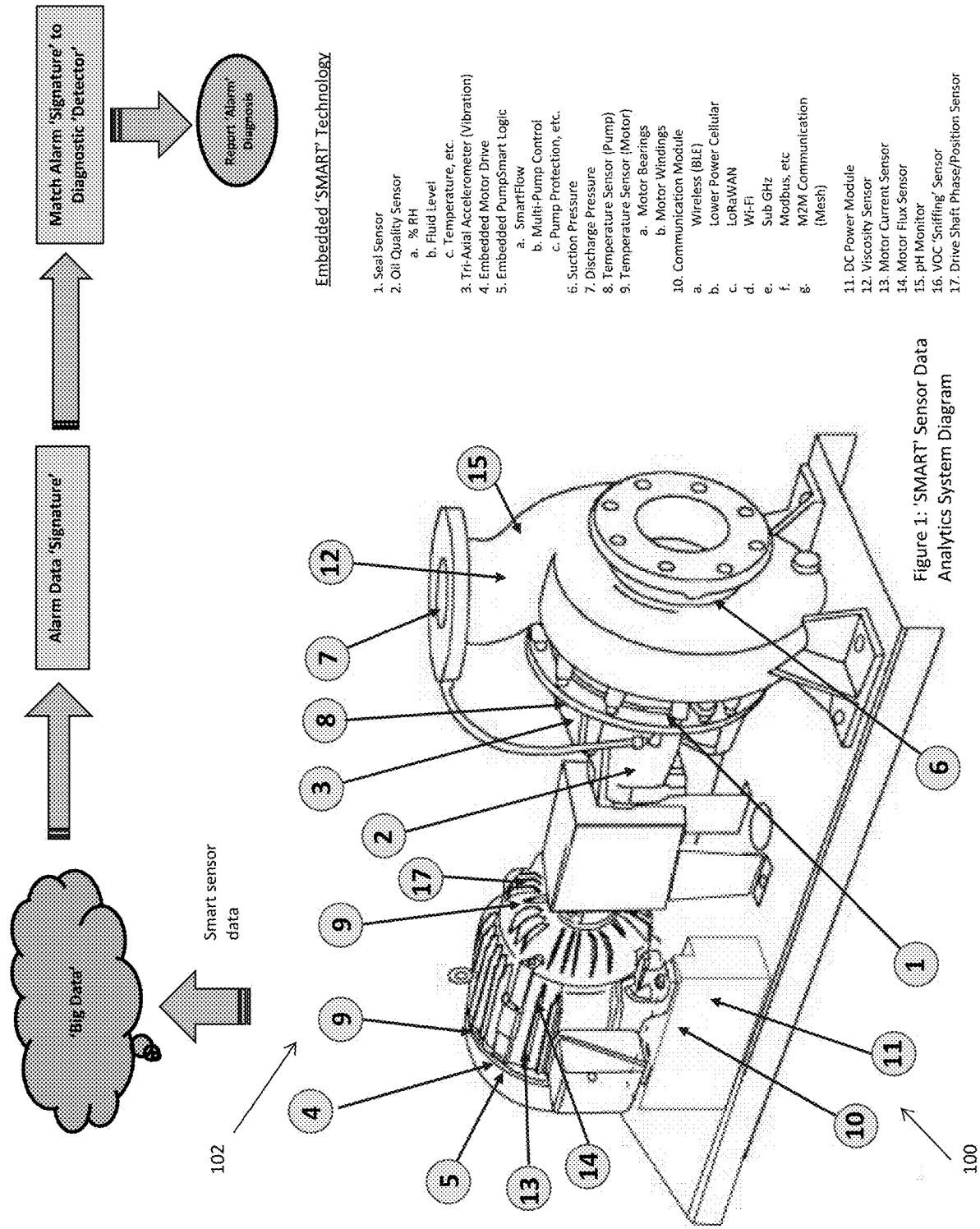
FIG. 1 is a diagram of a smart sensor data analytics system, according to some embodiments of the present invention.

FIG. 1 shows a smart sensor data analytics system generally indicates as 100 that includes rotary equipment 102, e.g., having smart devices or sensors labeled 1 thru 17 placed or arranged on the rotary equipment 102 to sense one or more parameters related thereto, according to some embodiments of the present invention. The smart device or sensors 1 thru 17 may include one or more seal sensors 1, oil quality sensors 2 for sensing % contaminates, fluid level, temperature, etc., tri-axial accelerometers 3 for sensing vibration, e.g., along an X, Y or Z axis, embedded motor drive and sensors 4, embedded pump logic sensors 5 (e.g. including known PumpSmart™ logic developed by the assignee of the present invention), suction pressure sensors 6, discharge pressure sensors 7, pump temperature sensors 8, motor temperature sensors 9 for sensing motor bearing and winding temperatures, a wireless communication module 10 for exchanging sensor data and signaling, a DC power module for providing DC power 11 to the rotary equipment, a viscosity sensor 12 for sensing oil viscosity, a motor current sensor 13 for sensing motor current of the rotary equipment, a motor flux sensor 14 for sensing changes in magnetic flux to access motor health and detect faults, a pH monitor 15 for sensing pH of liquid being transported, VOC "sniffing" sensor 16, and/or a drive/shaft phase/position sensor 17. The smart devices or sensors may also include a network gateway for connecting the smart sensors (devices) to the 'cloud'. This allows the sensor data to be transported to the 'cloud' for future 'cloud computing' and data analysis, e.g., consistent with the functionality of the rotary equipment 102 set forth herein.

In the smart sensor data analytics system 100, the smart devices or sensors 1 thru 17 can provide smart device or sensor signaling, e.g., containing smart sensor data to a "big data" cloud configuration. The smart sensor data may include one or more alarm data 'signatures'. The alarm data 'signature' may be compared to one or more diagnostic 'detectors' (aka "diagnostic 'detector' signatures"), and if an alarm data 'signature' matches a diagnostic 'detector' signature, then the smart sensor data analytics system provides a report 'alarm' diagnosis. By way of example, the comparison may be implemented locally in the smart devices or sensors 1 thru 17, as well as remotely in an off-site cloud-based server configuration. By way of example, the report 'alarm' diagnosis may be further processed to turn the rotary equipment off, issue a suitable audio or visual alarm warning, schedule a suitable maintenance event, etc. (The scope of the invention is not intended to be limited to the type or kind of further processing engaged in, or called for, e.g., by the report 'alarm' diagnosis, and may include further processing both now known or later developed in the future.)

According to some embodiments, one or more of the smart device or sensors 1 thru 17 may include, or take the form of, an alarm signature and diagnostic detector for implementing the signal processing functionality of the present invention. Embodiments are envisioned, and the scope of the invention is intended to include, implementing the alarm signature and diagnostic detector signal processing functionality in a device or component other than the smart sensor, e.g., including where the device or component is local to the one or more of the smart device or sensors, as well as located remotely, such as an off-site implementation, etc.

FIG. 2

Figure 2:
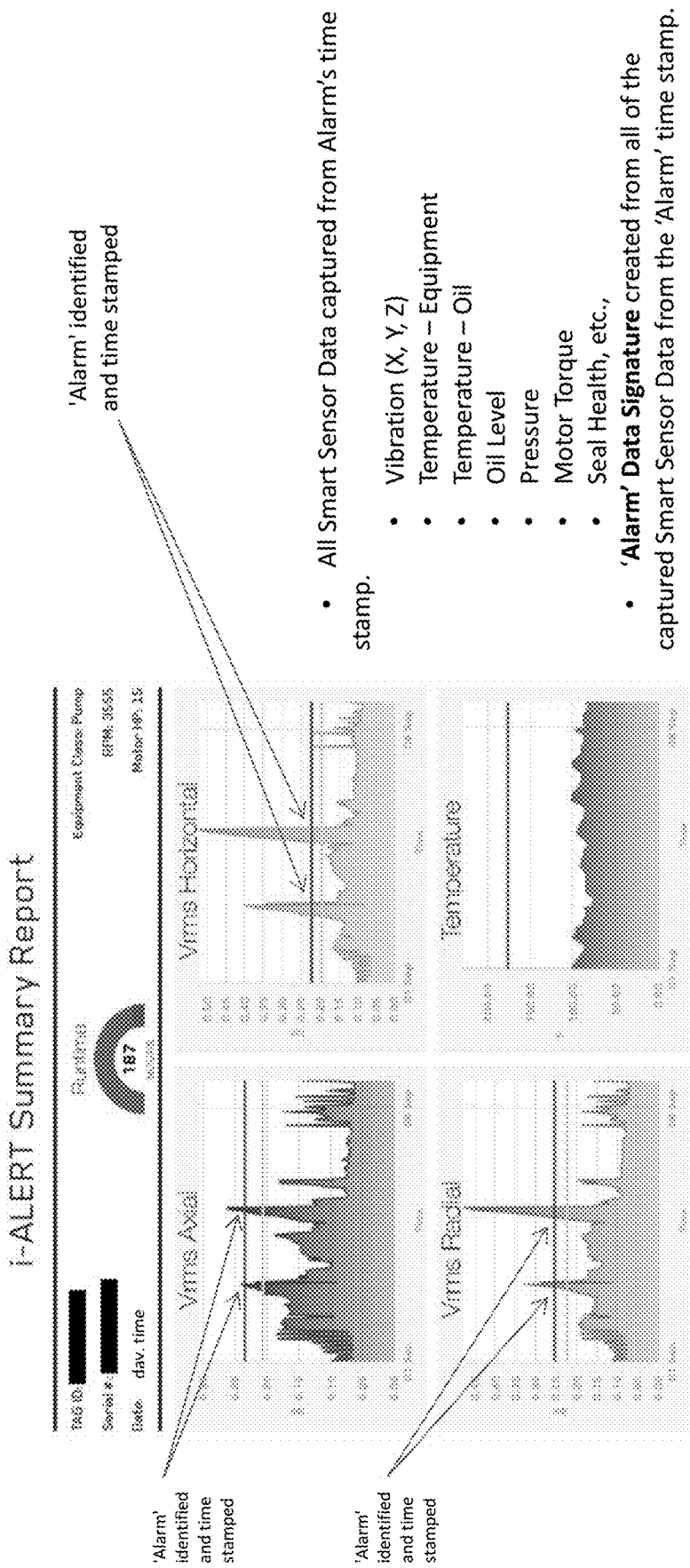
FIG. 2 is a diagram of an exemplary i-Alert™ sensor summary report, e.g., for an equipment class: pump, having a run time of 187 hours, an RPM of 3555, a motor HP of 15, having Vrms Axial, Vrms Radial, Vrms Horizontal graphs showing alarm identification and data capture, and also including a temperature graph, according to some embodiments of the present invention.

By way of example, FIG. 2 shows an i-Alert™ sensor summary report, e.g., for an equipment class: pump, having a run time of 187 hours, an RPM of 3555, a motor HP of 15, having Vrms Axial, Vrms Radial, Vrms Horizontal graphs showing alarm identification and data capture. The sensor summary report shown in FIG. 2 also includes a temperature graph.

Consistent with that shown in FIG. 2, all smart sensor data captured from alarm's time stamp may include one or more of the following:
Vibration (X, Y, Z)
Temperature—Equipment
Temperature—Oil
Oil Level
Pressure
Motor Torque
Seal Health, etc., 'Alarm' data signature may be created from all of the captured smart sensor data from the 'alarm' time stamp, e.g., consistent with that disclosed herein.

FIG. 3

Figure 3:
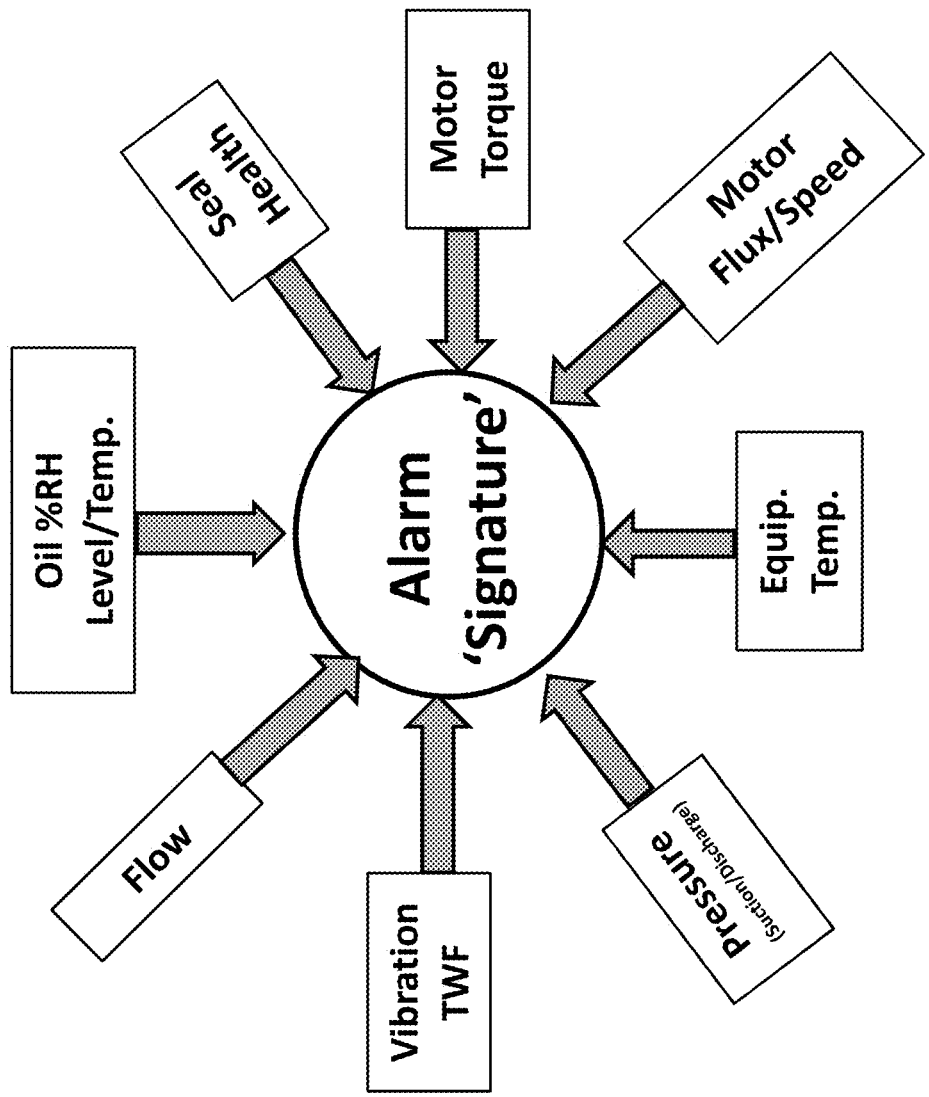
FIG. 3 is a diagram showing an alarm signature creation, e.g., where the creation is based upon some combination of parameters related to oil % RH level/temperature, seal health, motor torque, motor flux/speed, equipment temperature, pressure (e.g., including suction/discharge), vibration (e.g., using time wave form (TWF)), flow, etc.

By way of example, FIG. 3 shows an alarm signature creation, e.g., based upon a combination of one or more of the following: oil % RH level/temperature, seal health, motor torque, motor flux/speed, equipment temperature, pressure (e.g., including suction/discharge), vibration (e.g., using time wave form (TWF)), flow, etc. In effect, each alarm condition creation may be a function of sensed, captured and time-stamped signature parameters related to one or more of the aforementioned parameters, e.g., consistent with that shown in FIG. 4. By way of example, alarm signature creations for one or more diagnostic detectors may be preprogrammed and stored in a diagnostic detector signature database in the alarm signature and diagnostic detector and/or learned over time by the alarm signature and diagnostic detector and updated in stored in the diagnostic detector signature database, e.g., consistent with that set forth below.

FIG. 4

Figure 4:
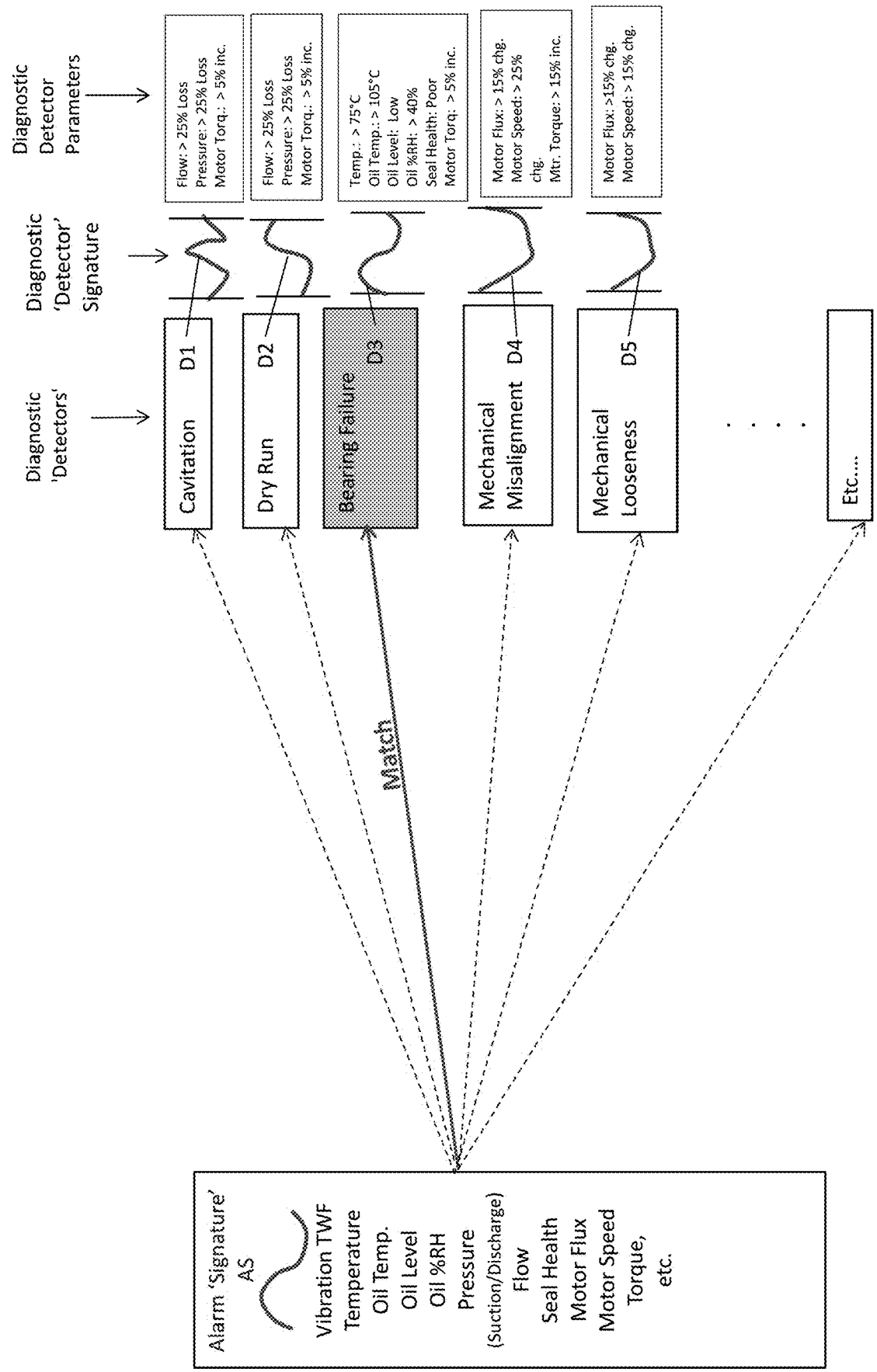
FIG. 4 is a diagram showing an alarm signature on the left and diagnostic detectors on the right, and an indication of a match for a bearing failure based upon a so-called "best" match approach, according to some embodiments of the present invention.

FIG. 4 shows an alarm signature AS on the left and various diagnostic detector signatures D1 thru D5 for diagnostic detectors on the right, and an indication of a match for a bearing failure based upon a so-called "best" match approach between the alarm 'signature' and the diagnostic 'detector' signature for the bearing failure. Consistent with that shown in FIG. 4, a visual comparison of the alarm 'signature' and the diagnostic 'detector' signatures for a cavitation alarm condition, a dry run alarm condition, a mechanical misalignment alarm condition, a mechanical looseness alarm condition, etc. do not match as well as the diagnostic 'detector' signature for the bearing failure alarm condition, and thus are not "best" matches.

By way of example, the cavitation alarm condition may be based in part on captured parameters that include a flow that has a greater than a 25% loss, a pressure that has a greater than a 25% loss, and a motor torque that has a greater than a 5% increase. See the diagnostic 'detector' signature D1.

By way of example, and similarly, the dry run alarm condition may be based in part on captured parameters that include a flow that has a greater than a 25% loss, a pressure that has a greater than a 25% loss, and a motor torque that has a greater than a 5% increase. See the diagnostic 'detector' signature D2, which has a different waveform from D1.

By way of example, the bearing failure alarm condition may be based in part on captured parameters that include a temperature that is greater than 75° C., an oil temperature that is greater than 105° C., an oil level that is low, an oil % RH that is greater than 40%, a seal health that is poor, and a motor torque that has a greater than a 5% increase. See the diagnostic 'detector' signature D3.

By way of example, the mechanical misalignment alarm condition may be based in part on captured parameters that include a motor torque that is greater than a 15% change, a motor speed that is greater than a 25% change and a motor torque that is greater than a 15% change. See the diagnostic 'detector' signature D4.

By way of example, the mechanical looseness alarm condition may be based in part on captured parameters that include a motor flux that is greater than a 15% change and a motor speed that is greater than a 15% change. See the diagnostic 'detector' signature D5.

In FIG. 4, it is important to note the following:
Each 'Detector' may use a unique subset of the captured Alarm 'Signature' parameters, as shown.
'Detectors' can be self-learning by feeding them both labeled and unlabeled Alarm Data 'Signatures'.
For example, unlabeled Alarm 'Signatures' may be compared to existing diagnostic 'detector' signatures to find a so-called 'best' match. This 'unlabeled' Signature could then become 'labeled' and cause a potential update to the 'overall Detector' algorithm.

Figure 5:
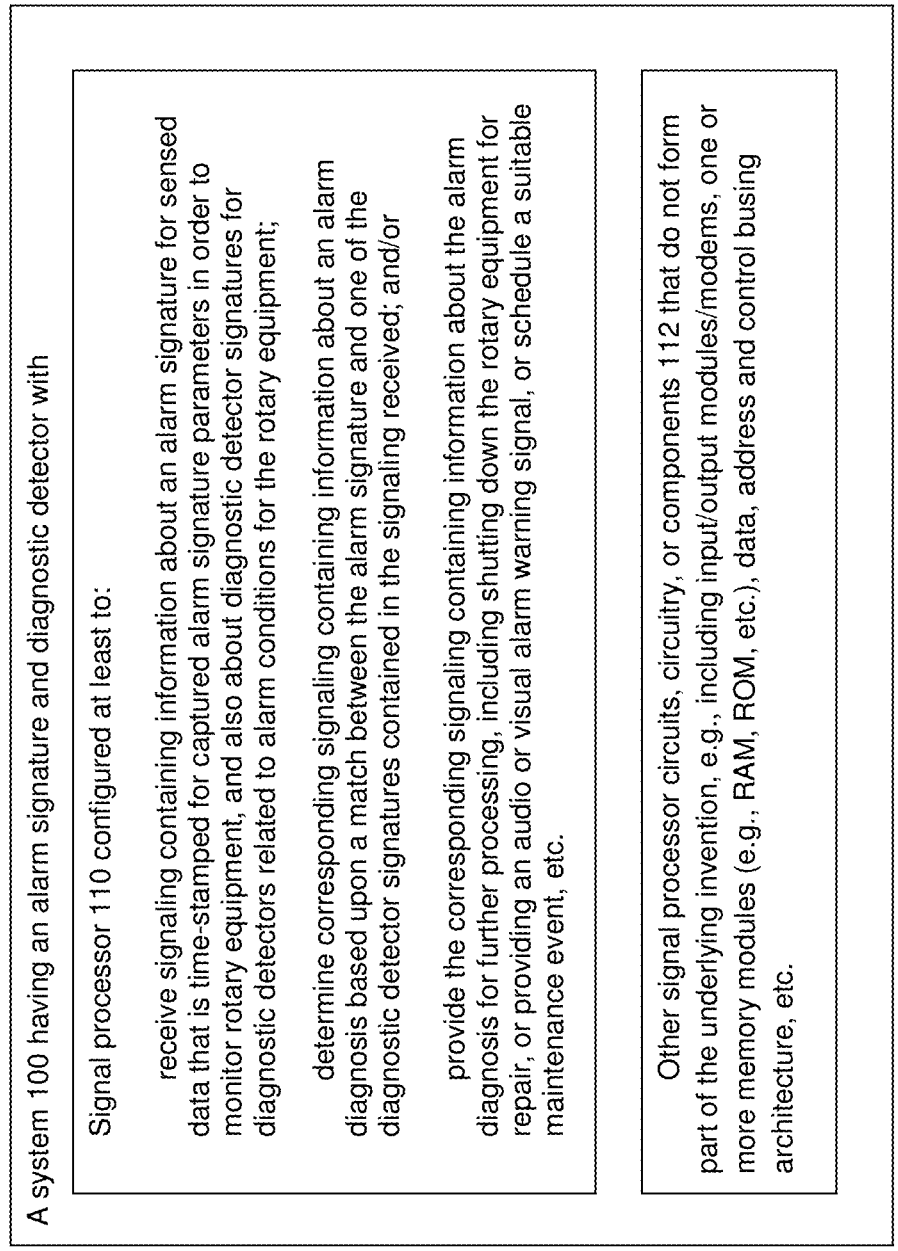
FIG. 5 is a block diagram of a system having an alarm signature and diagnosis detector having a signal processor for implementing signal processing functionality, according to some embodiments of the present invention.

FIG. 5: Signal Processor Implementation

The system 100 for performing sensor data analytics for equipment diagnostics may include an alarm signature and diagnostic detector having a signal processor or processing circuit/module 112, e.g., that may be configured to perform basic signal processing functionality for implementing the present invention, e.g., consistent with that disclosed herein. By way of example, the signal processor 110 may be configured as a stand alone signal processor or signal processing module, form part of a control or controller circuit/module, etc., or form part of some other circuit/circuitry/module. Many different types and kinds of signal processors, controllers and controller modules are known in the art, for example, including programmable logic controllers, etc. By way of example, based on an understanding of such known signal processors, one skilled in the art would be able to configure the signal processor 110 to perform the aforementioned signal processing functionality consistent with that described herein.

By way of still further example, the functionality of the signal processor 110 may be implemented using hardware, software, firmware, or a combination thereof, although the scope of the invention is not intended to be limited to any particular embodiment thereof. In a typical software implementation, such a signal processor or signal processing module may include one or more microprocessor-based architectures having a microprocessor, a random access memory (RAM), a read only memory (ROM), input/output devices and control, data and address buses connecting the same like that in element 112, e.g., for running a program code based upon an algorithm consistent with that disclosed herein. One skilled in the art would be able to program such a microprocessor-based implementation to perform the signal processing functionality described herein without undue experimentation, including where the signal processor and a memory combine to implement a program code, e.g., stored in the memory, so as to cause the signal processor to implement the aforementioned signal processing functionality. The scope of the invention is not intended to be limited to any particular implementation using technology both now known or later developed in the future.

The signal processor 110 may include the one or more other circuits/modules like element 112 to perform other functionality that is known in the art, that does not form part of the underlying invention, and that is not described in detail herein. By way of example, the other circuits/modules 112 may include input/output circuit/modules, memory circuit/modules (e.g., RAM, ROM, EPROM, etc.), busing circuit/modules or architecture for exchanging signaling between the various circuit/modules, etc.

In operation, the signal processor 110 may be configured to receive signaling containing information about an alarm signature for sensed data that is time-stamped for captured alarm signature parameters in order to monitor rotary equipment, and also about diagnostic detector signatures for diagnostic detectors related to alarm conditions for the rotary equipment; and determine corresponding signaling containing information about an alarm diagnosis based upon a match between the alarm signature and one of the diagnostic detector signatures contained in the signaling received. By way of example, the signaling may be stored in a database in the memory forming part of element 112 and provided to the signal processor 110.

Moreover, the signal processor 110 may be configured to determine and provide the corresponding signaling containing information about the alarm diagnosis for further processing, including shutting down the rotary equipment for repair, providing an audio or visual alarm warning signal, or schedule a suitable maintenance event. By way of example, the provisioning of the corresponding signaling may be implemented by an output module forming part of element 112.

Rotary Equipment

Rotary equipment, as well as vibrating machines or structures, e.g., like pumps or rotary devices, reciprocating machines, engines, blowers, are known in the art, and are not described in detail herein. Moreover, the scope of the invention is not intended to be limited to any particular type or kind thereof that is either now known or later developed in the future.

Best Match Signature Comparison Techniques

Best match signature comparison techniques are known in the art, and the scope of the invention is not intended to be limited to any particular type or kind thereof either now known or later developed in the future. By way of example, the signal processor may be configured to compare signature waveforms containing information about the alarm signature AS (see FIG. 4, left side) and the diagnostic detector signatures D1 thru D5 (see FIG. 4, right side) are compared. The similarities between the waveforms of the alarm signature AS and the diagnostic detector signature D3 are visually apparent in FIG. 4 as a best match, especially when compared to the waveforms for the diagnostic detector signatures D1-D2 and D4-D5.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A system for performing sensor data analytics for equipment diagnostics, the system comprising:
an alarm signature and diagnostic detector having a signal processor configured to:
receive signaling containing information about an alarm signature for sensed data that is time-stamped for captured alarm signature parameters to monitor rotary equipment and diagnostic detector signatures for diagnostic detectors related to alarm conditions for the rotary equipment; and
determine corresponding signaling containing information about an alarm diagnosis based upon a match between the alarm signature and one of the diagnostic detector signatures contained in the signaling received; and
a smart condition monitoring device that is placed in relation to the rotary equipment and configured to sense the captured alarm signature parameters, time-stamp the captured alarm signature parameters sensed, and provide sensed signaling containing information about sensed, time-stamped and captured alarm signature parameters.

2. The system according to claim 1, wherein the signal processor is configured to provide the corresponding signaling containing information about the alarm diagnosis for further processing, including shutting down the rotary equipment for repair, or providing an audio or visual alarm warning signal, or scheduling a suitable maintenance event.

3. The system according to claim 1, wherein the smart condition monitoring device includes the alarm signature and diagnostic detector.

4. The system according to claim 1, wherein the sensed, time-stamped and captured alarm signature parameters include one or more of the following:
vibration (X, Y, Z axes),
equipment temperature,
oil level or temperature and % RH,
suction or discharge pressure,
motor torque, flux or speed,
flow, or
seal health.

5. The system according to claim 1, wherein the diagnostic detector signatures include signatures related to a cavitation alarm condition, a dry run alarm condition, a bearing failure alarm condition, a mechanical misalignment alarm condition, a mechanical looseness alarm condition, a vibration (X, Y, Z axes) alarm condition, an equipment temperature alarm condition, an oil level, % RH, or temperature alarm condition, a suction or discharge pressure alarm condition, a motor torque, flux or speed alarm condition, a flow alarm condition, or a seal health alarm condition.

6. The system according to claim 1, wherein each alarm signature and diagnostic detector uses a respective subset of the captured alarm signature parameters.

7. The system according to claim 1, wherein the alarm signature and diagnostic detector is configured to self-learn by receiving both labeled and unlabeled alarm signatures for storing in a diagnostic detector signature database in a memory as one or more stored diagnostic detector signatures.

8. The system according to claim 7, wherein the signal processor is configured to:
compare an unlabeled alarm signature to the one or more of existing diagnostic detector signatures to find a best match,
label the unlabeled alarm signature as an updated labeled alarm signature, and
update the diagnostic detector signature database with the updated labeled alarm signature.

9. The system according to claim 1, wherein the alarm signature and diagnostic detector is configured remotely from the smart condition monitoring device.

10. A method for performing sensor data analytics for equipment diagnostics, the method comprising:
placing a smart condition monitoring device in relation to rotary equipment to sense captured alarm signature parameters, time-stamp the captured alarm signature parameters sensed, and provide sensed signaling containing information about sensed, time-stamped and captured alarm signature parameters;
receiving, with a signal processor in an alarm signature and diagnostic detector, the sensed signaling containing information about an alarm signature for sensed data from the smart condition monitoring device to monitor rotary equipment and diagnostic detector signatures for diagnostic detectors related to alarm conditions for the rotary equipment; and determining, with the signal processor, corresponding signaling containing information about an alarm diagnosis based upon a match between the alarm signature and one of the diagnostic detector signatures contained in the signaling received.

11. The method according to claim 10, wherein the method comprises providing, with the signal processor, the corresponding signaling containing information about the alarm diagnosis for further processing, including shutting down the rotary equipment for repair or providing an audio or visual alarm warning signal.

12. The method according to claim 10, wherein the method comprises configuring the smart condition monitoring device with the alarm signature and diagnostic detector.

13. The method according to claim 10, wherein the method comprises configuring the alarm signature and diagnostic detector remotely from the smart condition monitoring device.

14. The method according to claim 10, wherein the sensed, time-stamped and captured alarm signature parameters include one or more of the following:
vibration (X, Y, Z axes),
equipment temperature,
oil level or temperature and % RH,
suction or discharge pressure,
motor torque, flux or speed,
flow, or
seal health.

15. The method according to claim 10, wherein the diagnostic detector signatures include signatures related to a cavitation alarm condition, a dry run alarm condition, a bearing failure alarm condition, a mechanical misalignment alarm condition, a mechanical looseness alarm condition, a vibration (X, Y, Z axes) alarm condition, an equipment temperature alarm condition, an oil level or temperature and % RH alarm condition, a suction or discharge pressure alarm condition, a motor torque, flux or speed alarm condition, a flow alarm condition, or a seal health alarm condition.

16. The method according to claim 10, wherein each alarm signature and diagnostic detector uses a respective subset of the captured alarm signature parameters.

17. The method according to claim 10, wherein the method comprises configuring the alarm signature and diagnostic detector to self-learn by receiving both labeled and unlabeled alarm signatures for storing in a diagnostic detector signature database in a memory as one or more stored diagnostic detector signatures.

18. The method according to claim 17, wherein the method comprises configuring the signal processor to:
compare an unlabeled alarm signature to the one or more of existing diagnostic detector signatures to find a best match,
label the unlabeled alarm signature as an updated labeled alarm signature, and
update the diagnostic detector signature database with the updated labeled alarm signature.

* * * * *